April 10, 1945.  P. JOHNSTON  2,373,246
METHOD OF MAKING LENS BLANK
Original Filed March 21, 1941   3 Sheets-Sheet 1
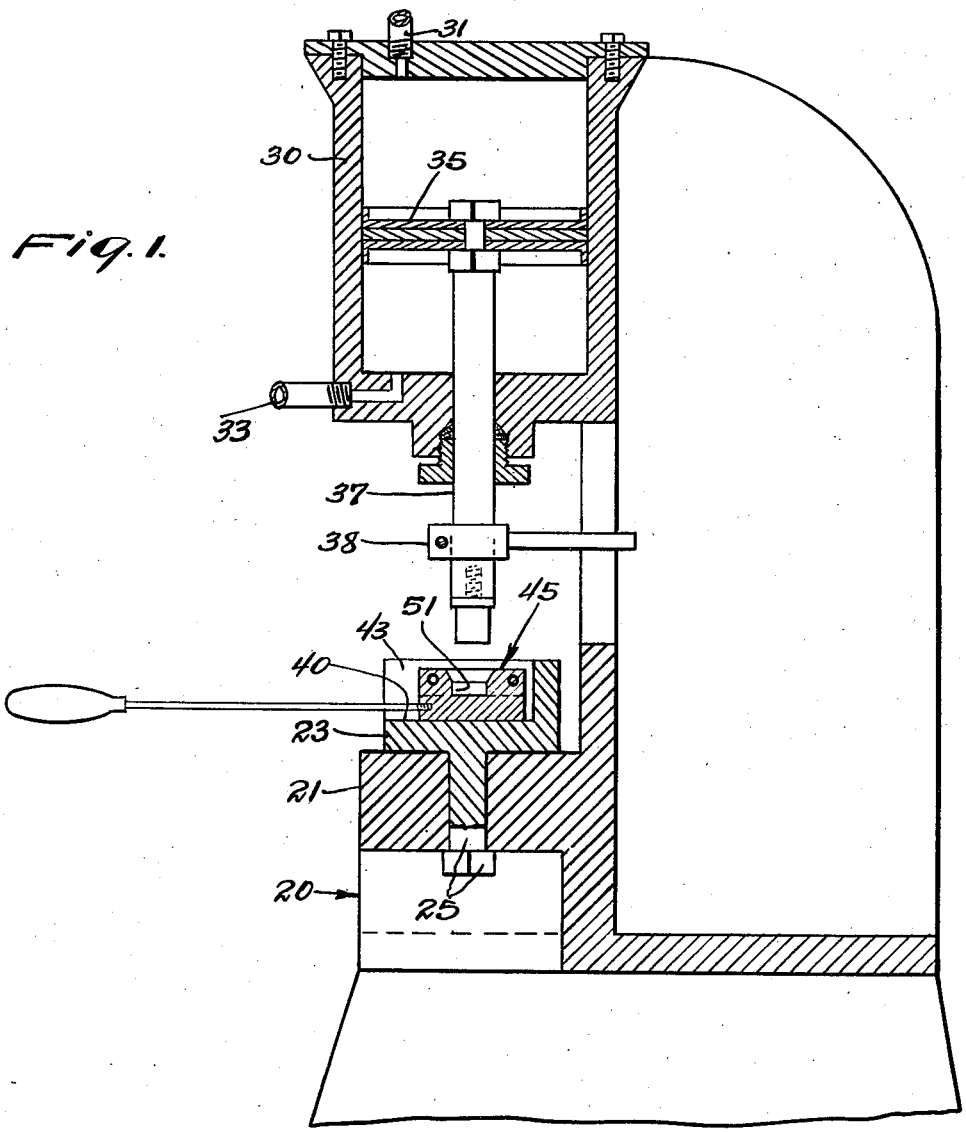
Fig. 1.
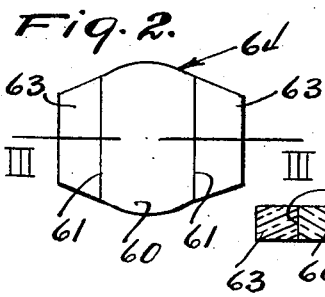
Fig. 2.
Fig. 3.
Inventor
PERRY JOHNSTON
By Olen E. Bee
Attorney

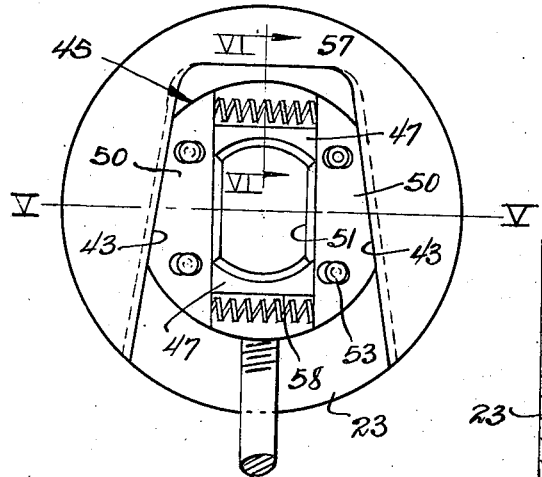
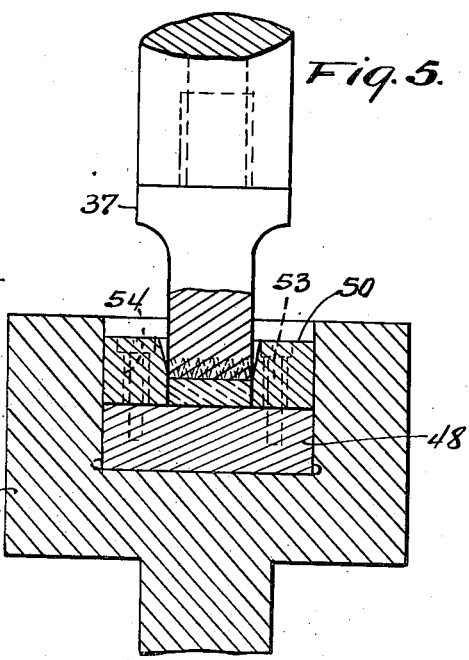
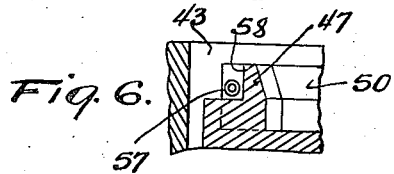
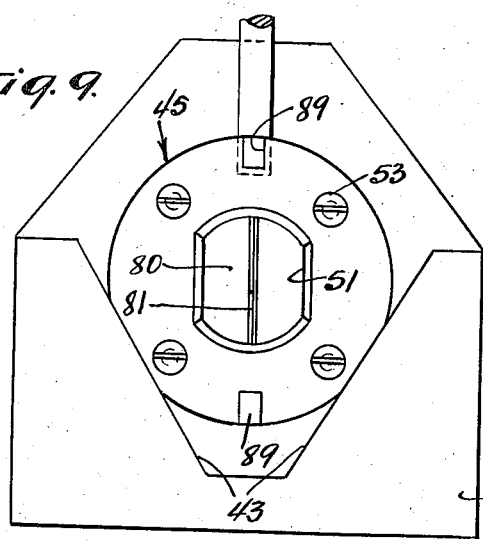
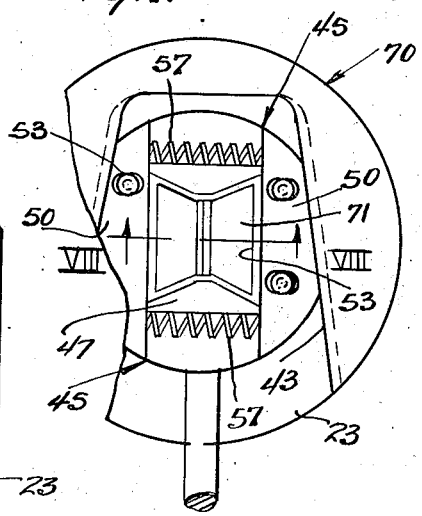
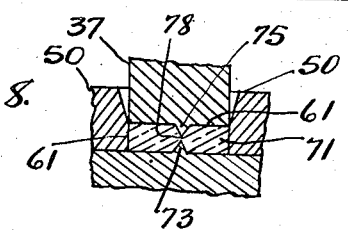
April 10, 1945.   P. JOHNSTON   2,373,246
METHOD OF MAKING LENS BLANK
Original Filed March 21, 1941    3 Sheets-Sheet 2
Inventor
PERRY JOHNSTON
By Olen E. Bee
Attorney

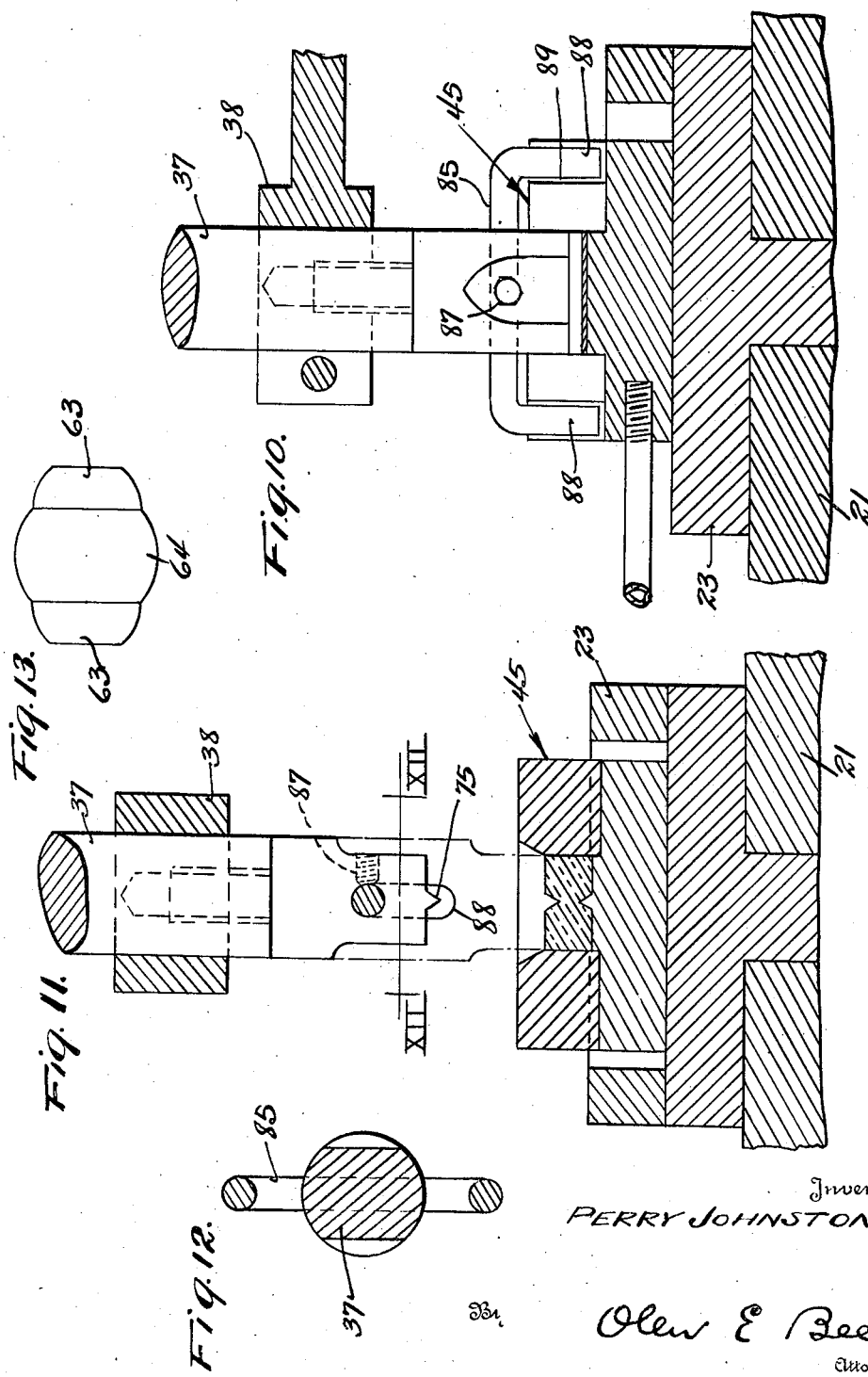

Patented Apr. 10, 1945

2,373,246

UNITED STATES PATENT OFFICE 2,373,246

METHOD OF MAKING LENS BLANKS

Perry Johnston, Ford City, Pa., assignor to Pittsburgh Plate Glass Company, Allegheny County, Pa., a corporation of Pennsylvania Original application March 21, 1941, Serial No. 384,518. Divided and this application January 1, 1942, Serial No. 425,294

2 Claims. (Cl. 49—79)

This invention relates to methods of molding lens blanks and it has particular relation to the formation of compound or composite lens.

This application is a division of my copending application, Serial No. 384,518, filed March 21, 1941, now Patent No. 2,335,419, granted Nov. 30, 1943.

One object of the invention is to provide an improved method of making a lens blank in which two or more sections of glass are incorporated.

Another object of the invention is to provide an improved method of molding and assembling a composite lens blank.

Another object of the invention is to provide an improved apparatus for molding lens blanks.

Another object of the invention is to provide an improved method of making relatively small lens blank sections in such manner as to minimize inherent strains therein which might otherwise occur.

In the manufacture of lens in which more than one type of glass is required, difficulties arise in many instances because of the problems involved in molding or otherwise forming relatively small sections suitable for the finished composite lens. For example, in one type of composite lens, a central section of glass is flanked by two wing sections abutted and fused in edge-to-edge relation thereto. Many of these lenses are so small that it is difficult to handle molten glass in a mold so as to prevent undesirable inherent strains in the small blank. There is also difficulty in molding these blanks in such manner as to perfect absolutely perpendicular relation between the faces of the blank and their adjacent edges. It is desirable to mold these lenses originally with perfectly squared edges because otherwise the line of demarcation between the sections will be visible and objectionable after completion of the article. On the other hand, it has heretofore been difficult to remove molded glass from a mold if the walls thereof are not at least sloping to a slight degree.

This invention is designed to obviate the difficulties previously encountered under these circumstances by providing for the manufacture of sections of composite lenses so that their faces and edges are perfectly squared and at the same time providing for the manufacture of the smaller sections which will be substantially free from strains or other undesirable characteristics.

In the drawings:

Fig. 1 is a vertical section of a molding apparatus in which the invention has been incorporated; Fig. 2 is a plan of a composite lens blank; Fig. 3 is a cross section of a blank taken substantially along the line III—III of Fig. 2; Fig. 4 is a fragmentary plan on a larger scale of a molding apparatus; Fig. 5 is a fragmentary vertical section of the molding apparatus taken substantially along the line V—V of Fig. 4 and including in addition a molding plunger positioned therein; Fig. 6 is a fragmentary cross section taken substantially along the line VI—VI of Fig. 4; Fig. 7 is a fragmentary plan similar to Fig. 4 illustrating another form of molding structure; Fig. 8 is a cross section taken substantially along the line VIII—VIII of Fig. 7; Fig. 9 is a fragmentary plan similar to Fig. 4 of another form of molding structure; Fig. 10 is a vertical section on a larger scale of the molding apparatus shown in Fig. 9 and including in addition a plunger in molding position; Fig. 11 is a vertical section similar to Fig. 10, but at right angles thereto and with the plunger retracted; Fig. 12 is a cross section taken substantially along the line XII—XII of Fig. 11; and Fig. 13 is a plan of a composite lens blank having wings formed in the apparatus shown in Figs. 9 to 11.

Referring to Figs. 1 to 4, a mold frame 20 is provided rigidly thereon with a bed plate 21 upon which a mold seating anvil 23 is secured by means of bolting elements 25. The upper portion of the frame is provided rigidly thereon with a cylinder 30 which has connected at its opposite ends fluid supply pipes 31 and 33 through which fluid can be passed to operate a piston 35 slidable in the cylinder. A plunger 37 rigidly secured to the piston constitutes a piston rod, and a guide 38 through which the shank of the plunger slides is secured rigidly to the body of the frame and extends laterally therefrom.

The anvil 23 has a horizontal upper mold seat 40 horizontally leveled to precision and is formed with upright walls 43 converging from the front portion of the seat rearwardly toward the body of the frame. A sectional mold 45 seats squarely upon the seat 40 and is provided with spaced end sections 47 which are integral with and rise integrally from the mold base 48 at opposite ends thereof. Opposite side sections are slidable upon the upper surface of the mold base 48 toward and away from opposite sides of the end sections 47, and these side sections converge along their outer walls correspondingly to the converging character of the anvil walls 43 between which they are movable to wedged position. A mold chamber 51 is thus formed and its bottom is horizontally leveled to precision. Upright bolts 53 are threaded in the base 48 and extend upwardly through slots 54 formed in the side sections 50 to permit lateral sliding action of these sections toward and away from each other upon the upper surface of the base. The inner vertical side walls of the sections 50 are precisely squared with respect to the bottom of the molding chamber. In wedging the converging outer sides of the sections 50 between the walls 43, the inner sides of said sections adjacent their outer ends are abutted against opposite sides of the end sections 47 to present the molding chamber 51 for the reception of the plunger 37. While the bottom of the molding chamber and each vertical wall portion are formed with such precision as to be absolutely squared, the chamber forming inner walls of the end sections 47 can be formed to converge slightly from top to bottom for the purpose of facilitating the removal of molded glass therefrom.

Compression springs 57 can be horizontally connected between corresponding end portions of the side sections 50 and the end sections are cut away (Fig. 6), as indicated at 58, to accommodate the compression springs which constantly exert force tending to spread the sections.

The mold containing a body of molten glass is placed flatly upon the upper surface of the anvil base 48 and then is wedged between the converging walls 43 thereof. In this position the molding chamber is alined vertically with the molding plunger 37 which is operated downwardly to the position shown in Fig. 5 to mold the central lens section 60 which, by virtue of the right angled relation between the bottom and sides of the mold chamber are so formed as to have perfectly squared edges 61. Wing sections 63 having edges formed to the same shape as the edges 61 are fused to the latter edges to complete a composite lens unit 64 (Fig. 2). A lens of this type is relatively small and the wing sections must be carefully formed in order to avoid undesirable strains and to insure proper consistency of the composition required for use in lens manufacture.

A second molding apparatus 70 (Figs. 7 and 8) is designed to provide for the formation of the wing sections 63 and has the same general structure as that described with reference to Figs. 4 to 6, with the exception of differences in the mold chamber and plunger end. Accordingly corresponding reference characters are employed to indicate like portions of the apparatus, and the foregoing description of mechanical parts applies thereto.

In connection with this form of mold, it is desirable to produce double blanks 71 which have perfectly squared edges for abutting and fusing with the squared edges 61 of the central blank 60. The bottom of the mold chamber 51 is provided with a knife edge 73 (Fig. 8) extending upwardly and integrally from the mold base 48 and the bottom surface of the plunger 37 is also provided with the knife edge 75 which is adapted to assume the position indicated in Fig. 8 in parallel opposed relation to the knife edge 73. The outer sides of the blank sections 63 are thus molded precisely to squared relation and a neck 78 is formed centrally of the blank 71 which can be severed therealong after removal from the mold.

In molding smaller sections of lens blanks it may be difficult to cause the glass to fill out the diagonally opposite corners of the mold chamber, and for this reason the type of mold shown in Figs. 9 to 12 has been designed. In the form of structure shown in these figures, the mold chamber 51 does not have movable side sections and its inner molding walls are slightly inclined or converged slightly in a downward direction for the purpose of facilitating removal of the molded glass therefrom. The knife edge 73 runs centrally and integrally with the chamber bottom and the plunger 37 is provided with complemental knife edge 75 which is alined in parallel relation to the knife edge 73.

A small body of optical glass which can be in block form is heated until it becomes softened or molten, but not sufficiently fluid to flow materially without pressure being exerted thereon, and this body is placed in the mold chamber. After a body of molten glass has been placed in the mold chamber 71 and pressed by lowering the plunger 37, the knife edges 73 and 75 will have been brought close together in slightly spaced edge-to-edge relation to provide a double lens blank 80 having a relatively narrow neck 81 centrally dividing the blank into two sections corresponding to the sections 63 already described, with the exception that the neck portions of the blank sections are milled or ground off to form squared edges. These edges are fused to the central blank 64 in the manner previously described and as shown in Fig. 13. This type of arrangement avoids the use of a mold having movable side sections for manufacture of the smaller wing sections of the lens but it entails additional milling or grinding of the edges to squared relation.

It may be desirable under certain conditions to provide additional structure to insure proper alinement of the knife edges 73 and 75 with each other and to this end, a finder 85 is secured transversely and adjustably through the plunger by means of a set screw 87. Opposite end portions of the finder are bent downwardly to form fingers 88 adapted to register with openings 89 provided in the upper portion of the mold.

Although practical structure involving the invention has been shown and described in detail, it will be apparent to those skilled in the art that the invention is not so limited but that various changes can be made therein without departing from the spirit of the invention or from the scope of the appended claims.

I claim:

1. A method of forming a lens unit which comprises melting a body of glass, molding under pressure from said body a central glass blank, forming opposite section-receiving edges on said blank, melting under pressure a body of molten glass into two sections integrally connected by a narrow central neck adapted to be broken without marring the two sections but sufficiently strong to insure unitary molding of the integrally connected sections, severing the latter body at its narrow neck to separate its two sections, finishing an edge of each of said sections after severance to fit in edge-to-edge relation on said central blank, and fusing the section-receiving edges to the finished edges of the lens sections to form a continuous composite lens unit.

2. A method of forming a lens unit which comprises melting a body of glass, molding under pressure from said body a central, substantially flat glass blank, forming opposite section-receiving edges on said blank at right angles to the opposite faces thereof, molding under pressure a body of molten glass into two substantially flat sections integrally connected by a relatively narrow central neck adapted to be broken without marring the two sections, but sufficiently strong to insure unitary molding of the integrally connected sections, severing the latter body at its narrow neck to separate its two sections, finishing an edge of each of said sections after severance at its neck-connecting portion and at right angles to its flat faces to fit in edge-to-edge relation on said section-receiving edges, and fusing the section-receiving edges to the edges of the lens sections to form a continuous composite lens unit.

PERRY JOHNSTON.